(12) United States Patent
Shimokawa et al.

(10) Patent No.: US 6,779,584 B2
(45) Date of Patent: Aug. 24, 2004

(54) METHOD FOR MANUFACTURING A CORE MOLD FOR FOAM-MOLDING AND THE CORE MOLD

(75) Inventors: Masaaki Shimokawa, Settsu (JP); Tsuyoshi Umetani, Settsu (JP); Mituharu Yamazumi, Settsu (JP)

(73) Assignee: Kaneka Corporation, Osaka (JP)

( * ) Notice: Subject to any disclaimer, the term of this patent is extended or adjusted under 35 U.S.C. 154(b) by 238 days.

(21) Appl. No.: 10/118,457

(22) Filed: Apr. 5, 2002

(65) Prior Publication Data

US 2002/0179272 A1 Dec. 5, 2002

(30) Foreign Application Priority Data

Apr. 9, 2001 (JP) ........................................ 2001-109967

(51) Int. Cl.[7] ................................................. B22C 7/00
(52) U.S. Cl. ......................... 164/6; 164/45; 219/69.17
(58) Field of Search ..................... 164/6, 45; 219/69.17

(56) References Cited

U.S. PATENT DOCUMENTS 4,813,859 A * 3/1989 Bullard et al. ............... 425/4 R
5,247,151 A * 9/1993 Hagerman ................ 219/69.14

FOREIGN PATENT DOCUMENTS

JP 2000-108134 4/2000

* cited by examiner

Primary Examiner—M. Alexandra Elve
Assistant Examiner—I.-H. Lin
(74) Attorney, Agent, or Firm—Hogan & Hartson, LLP

(57) ABSTRACT

A method for manufacturing a core mold for foam-molding 1, provided with a concavo-convex pattern 5 on its mold surface 1a for forming a design pattern 4 on the surface 3a of a foam-molded article 3, comprises the steps of forming a reverse concavo-convex pattern 7 that is reverse of the concavo-convex pattern 5 on the surface 6a of a core mold making model 6 made of a conductive material having the same shape as the mold surface 1a, and transferring the reverse concavo-convex pattern 7 by electric discharge machining to the mold surface 1a, so as to form the concavo-convex pattern 5.

3 Claims, 18 Drawing Sheets

1a    mold surface
2     component
6     core mold making model
6a    surface
7     reverse concavo-convex pattern

METHOD FOR MANUFACTURING A CORE MOLD FOR FOAM-MOLDING AND THE CORE MOLD

BACKGROUND OF THE INVENTION

1. Field of the Invention

The present invention relates to a method for manufacturing a core mold for foam-molding to be used for foaming by steam heating a multitude of pre-expanded beads filled in a mold unit to produce a foam-molded article, provided with a concavo-convex pattern on its mold surface for forming a design pattern on the surface of the foam-molded article, and to the core mold manufactured by such a method.

2. Description of the Related Arts

In this technical field, for example, JP-A-H12-108134 discloses a method for manufacturing a core mold for foam-molding wherein a model is first fabricated by adhering a sheet material having a concavo-convex pattern to a wood mold, and then a sand mold is produced to which the concavo-convex pattern is transferred from the model, after which a core mold for foam-molding having a mold surface to which the concavo-convex pattern is transferred from the sand mold is constructed by casting.

However, this prior art has a disadvantage in that a design pattern formed on a foam-molded article thereby produced utilizing a core mold for foam-molding is blurred.

In addition, in order to remanufacture the core mold for foam-molding it is necessary to produce the sand mold each time, therefore manufacturing costs will inevitably be high and making the sand mold also requires a high skill level. Accordingly, the yield of manufacturing a core mold for foam-molding is not satisfactory at present.

In view of the foregoing disadvantages, an object of the invention is to provide a method for manufacturing a core mold for foam-molding by which an unblurred design pattern can be formed on a foam-molded article and manufacturing costs can be lowered, as well as the core mold manufactured by such a method.

SUMMARY OF THE INVENTION

To accomplish the foregoing object, the present invention provides a first method for manufacturing a core mold for foam-molding provided with a concavo-convex pattern on its mold surface for forming a design pattern on the surface of a foam-molded article, comprising the steps of forming a reverse concavo-convex pattern that is the reverse of the concavo-convex pattern on the surface of a core mold making model made of a conductive material having the same shape as the mold surface, and transferring the reverse concavo-convex pattern by electric discharge machining to the mold surface, thus forming the concavo-convex pattern on the mold surface.

A second manufacturing method according to the invention further comprises the step of executing a plurality of times the transference by electric discharge machining, each time changing the relative positions of the core mold making model against the mold surface.

In a third manufacturing method according to the invention, the core mold making model is made of graphite.

Also, the invention provides the first core mold for foam-molding manufactured by the first method of the invention, comprising a steam path disposed through a convex portion of the concavo-convex pattern.

The second core mold for foam-molding according to the invention comprises a plurality of adjoining components, wherein the core mold for foam-molding manufactured by the first method and/or the first core mold for foam-molding are employed as components.

The third core mold for foam-molding according to the invention further comprises a steam path disposed at a joint of the components.

DESCRIPTION OF THE REFERENCE NUMERALS

Figure 1:
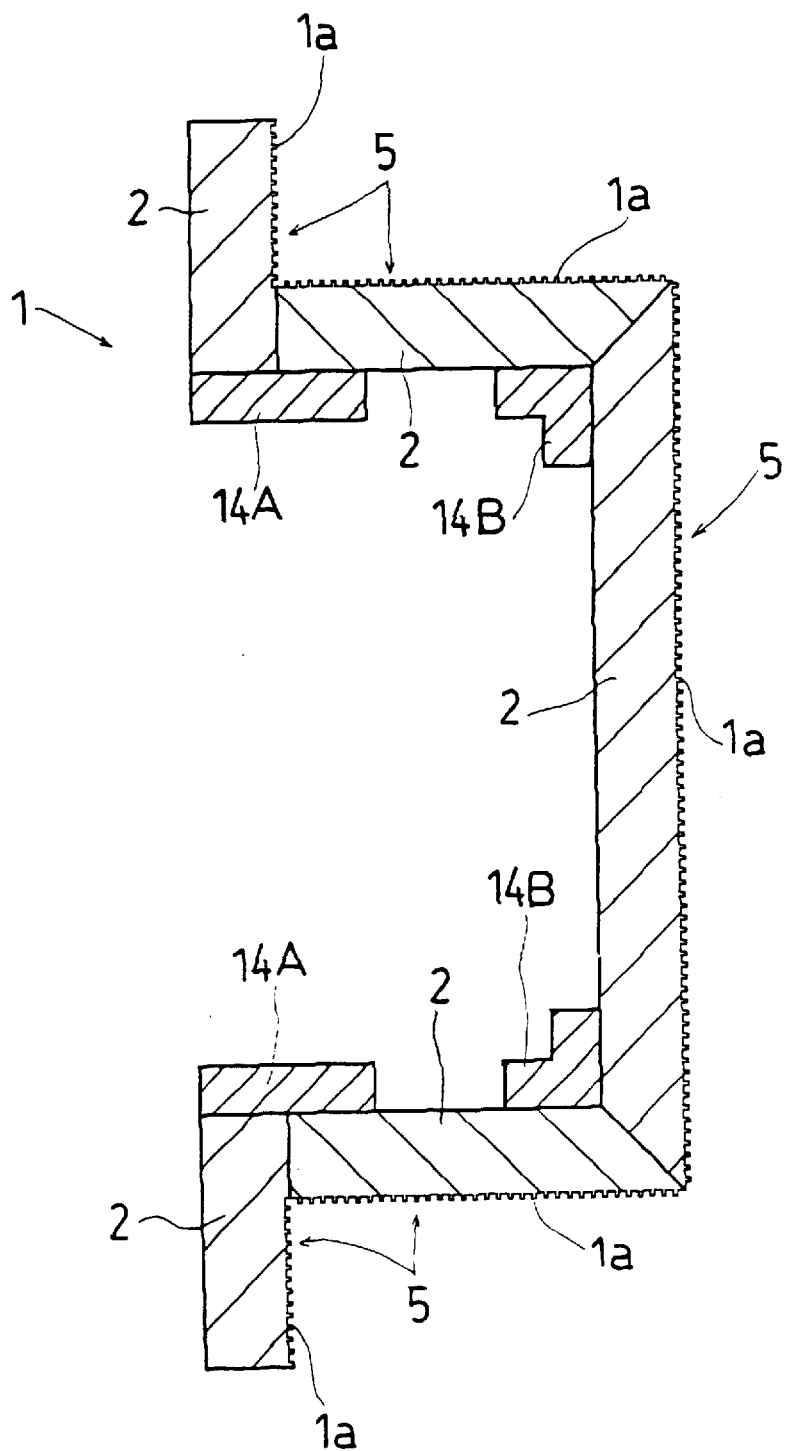
FIG. 1 is a schematic cross-sectional view of a core mold for foam-molding comprising a plurality of adjoining components manufactured by a method according to the first embodiment.

| | |
|---|---|
| 1, 31 | core mold for foam-molding |
| 1a, 31a | mold surface |
| 2 | component |

-continued

DESCRIPTION OF THE REFERENCE NUMERALS

| 3 | foam-molded article |
|---|---|
| 3a | surface |
| 4 | design pattern |
| 5 | concavo-convex pattern |
| 6 | core mold making model |
| 6a | surface |
| 7 | reverse concavo-convex pattern |
| 18 | steam path |
| 19 | convex portion |
| 22 | joint |

DESCRIPTION OF THE PREFERRED EMBODIMENTS

The embodiments of the present invention shall be described hereunder referring to the accompanying drawings.

As shown in FIG. 1 through FIG. 8, a method for manufacturing a component 2 comprising a core mold for foam-molding 1 according to the first embodiment can be defined as a method for manufacturing the component 2 provided with a concavo-convex pattern 5 on its mold surface 1a for forming a design pattern 4 on the surface 3a of a foam-molded article 3, comprising the steps of forming a reverse concavo-convex pattern 7 that is the reverse of the concavo-convex pattern 5, on the surface 6a of a core mold making model 6 made of a conductive material having almost the same shape as the mold surface 1a, and transferring the reverse concavo-convex pattern 7 by electric discharge machining to the mold surface 1a, so as to form the concavo-convex pattern 5.

Figure 2:
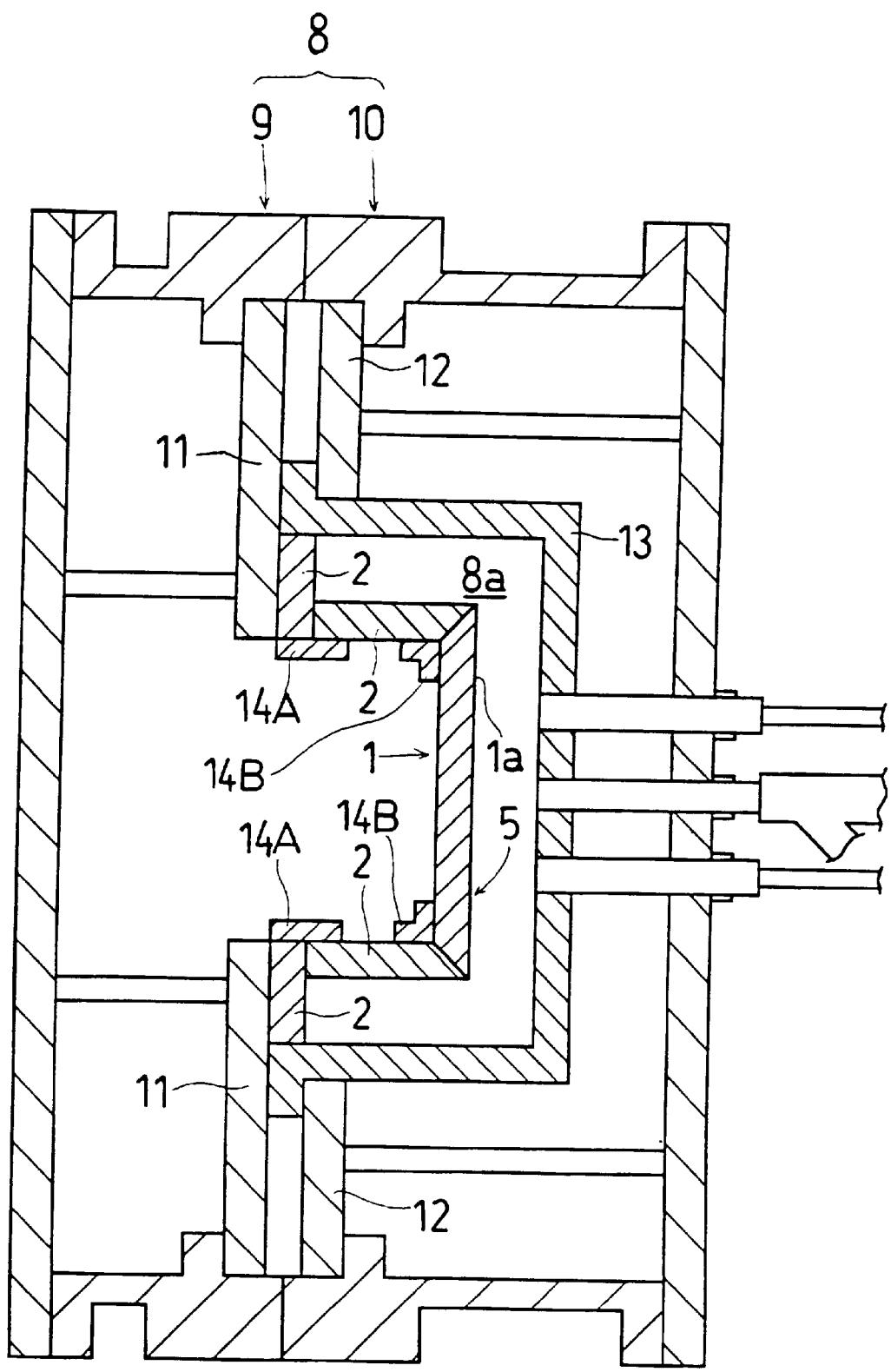
FIG. 2 is a schematic cross-sectional view of a mold unit.

Referring to FIG. 1, the core mold for foam-molding 1 is comprised of a plurality of components 2 of, for instance, a plain board shape adjoining so as to form a convexed shape, and is provided with a concavo-convex pattern 5 on its mold surface 1a. Referring to FIG. 2, the core mold for foam-molding 1 is fixed on core carrier plates 11 attached on either (mold 9 according to FIG. 2) of two molds 9 or 10 comprising a mold unit 8, with the mold surface 1a facing the inside 8a of the mold unit. Here, according to the first embodiment the core mold for foam-molding 1 has a convexed shape while the other core mold for foam-molding 13 fixed on the other core carrier plates 12 of the other mold 10 has a recessed shape, however without limitation to such a configuration it is also possible to form the core mold for foam-molding 1 in a recessed shape and the other core mold for foam-molding 13 in a convexed shape.

For adjoining the components 2, it is preferable to connect the components 2 as they are in an L-shape, or to cut off an end in a prescribed angle of, for example, 45 degrees and butt two such ends so that the concavo-convex pattern 5 on the mold surface 1a will be continuous, as shown in FIG. 1 and FIG. 2. Also, it is preferable to fix the joints between the components 2 so as not to leave a gap by fastening backing materials 14A and 14B having a planar or L-shaped cross-section by bolts to the rear portion.

Figure 3:
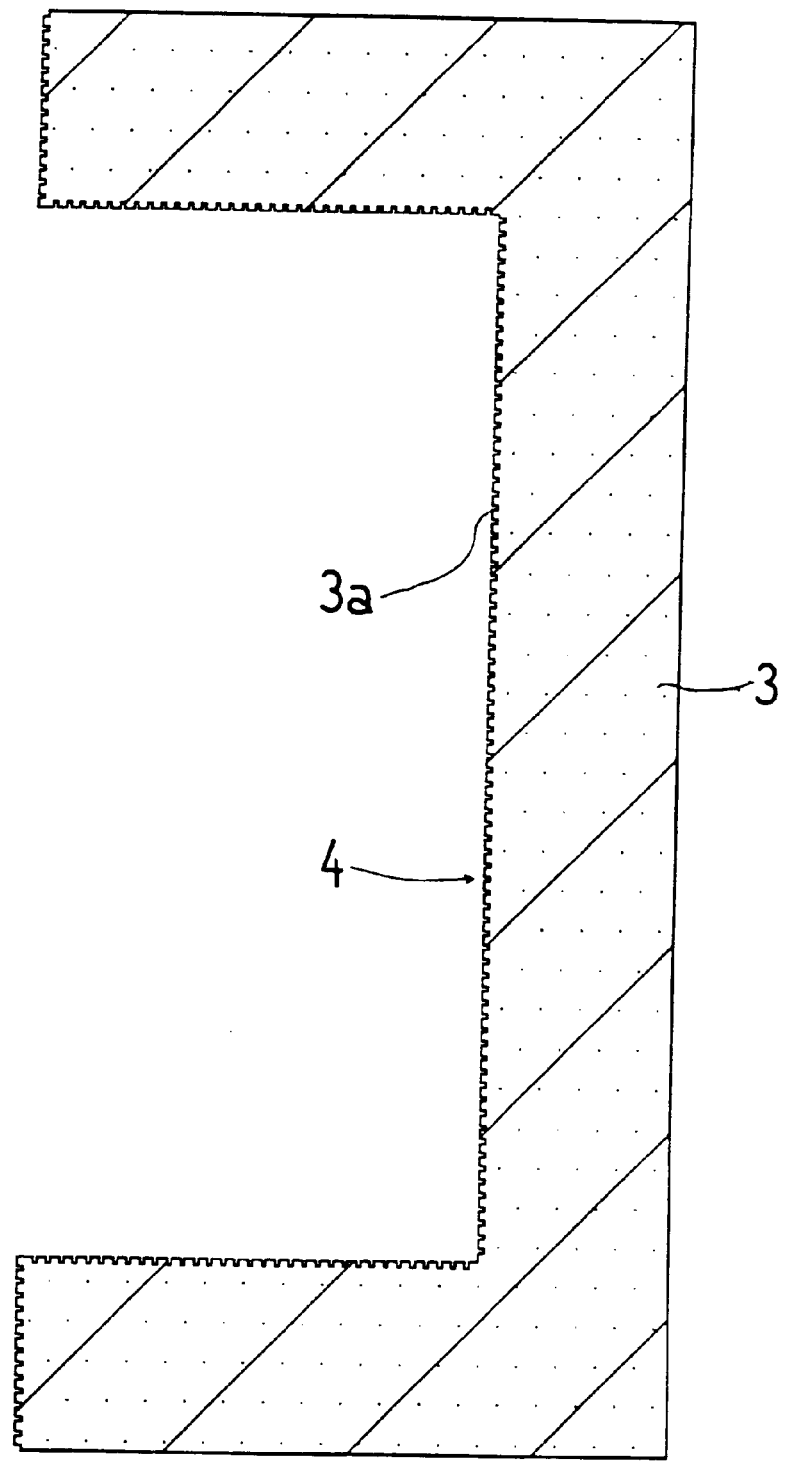
FIG. 3 is a cross-sectional view of a foam-molded article.

Referring to FIG. 3 the foam-molded article 3 is produced by foaming inside 8a of the mold unit as shown in FIG. 2, during which the concavo-convex pattern 5 on the mold surface 1a of the core mold for foam-molding 1 is transferred to the surface 3a so that a design pattern 4 is formed. As a result of such a process, hexagonal patterns formed with the foaming of the pre-expanded beads will not conspicuously appear, therefore the foam-molded article 3 will have an improve appearance.

Figure 4:
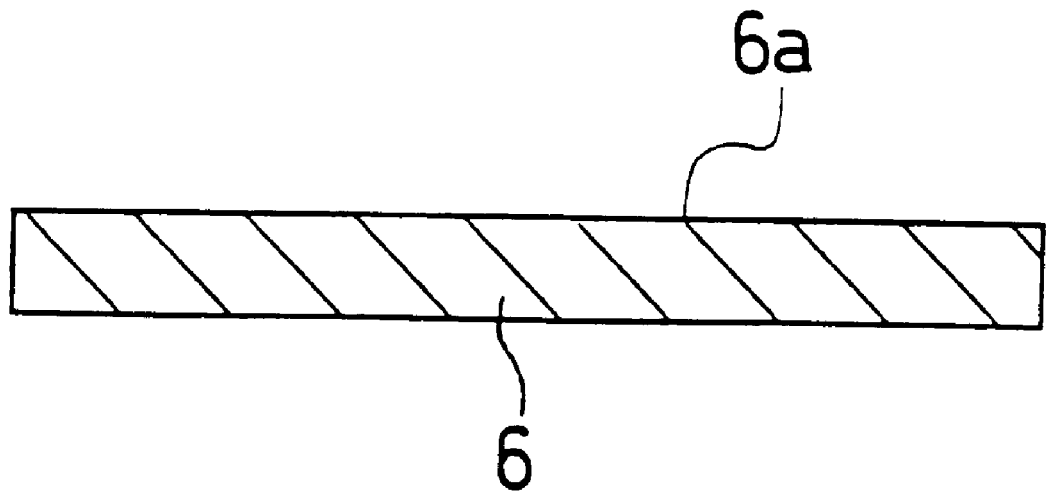
FIG. 4 is a cross-sectional view of a core mold making model before a reverse concavo-convex pattern is formed on it.
Figure 5:
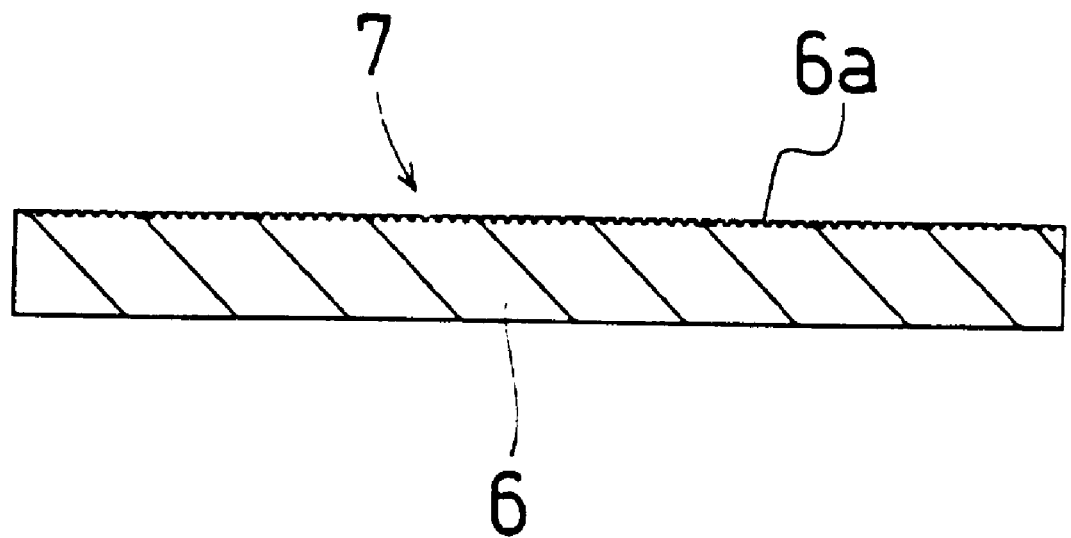
FIG. 5 is a cross-sectional view of the core mold making model with the reverse concavo-convex pattern formed on it.

The components 2 are made of an appropriate metal such as aluminum and are formed in a plain board shape. For forming a concavo-convex pattern 5 on the mold surface 1a of the components 2, first a reverse concavo-convex pattern 7 is formed on the surface 6a of a core mold making model 6 that is reverse of the concavo-convex pattern 5 as shown in FIGS. 4 and 5. For forming a reverse concavo-convex pattern 7, it is appropriate to use an NC (Numeral Control) machine, for example, "Machining Center PC55V" manufactured by Shin Nippon Koki Co., Ltd., or the like.

The core mold making model 6 is made of a conductive material and its surface 6a has almost the same shape as the mold surface 1a of the component 2. When the components 2 are of a plain board shape as in this embodiment, the core mold making model 6 can also have a plain board shape. The point is to ensure that the electric discharge machining will be properly performed on the surface 1a of the component 2, and for such an object it is desirable to form the surface 6a of the core mold making model 6 in the same shape as the mold surface 1a of the component 2.

Figure 6:
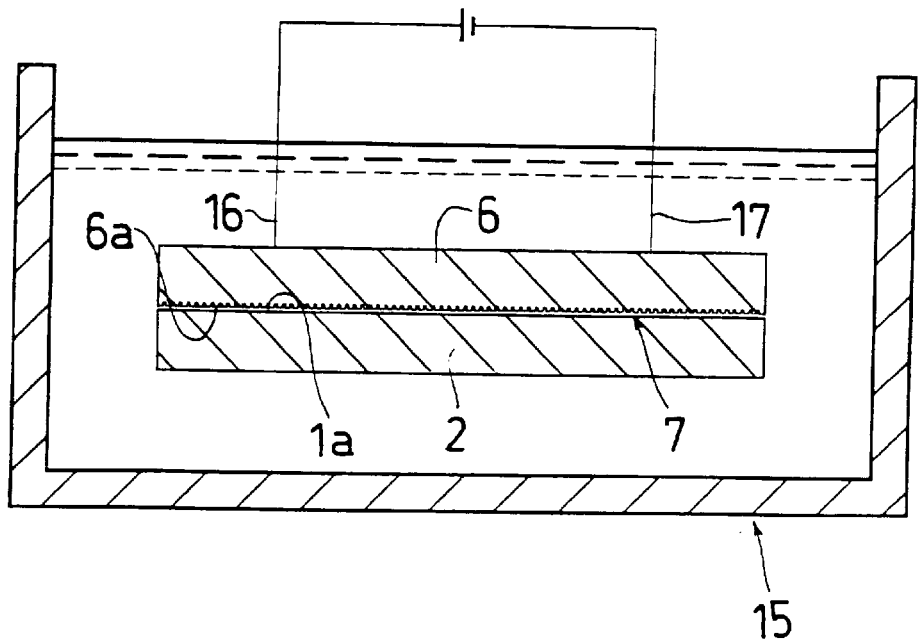
FIG. 6 is a schematic cross-sectional view showing a state where electric discharge machining is being performed.
Figure 7:
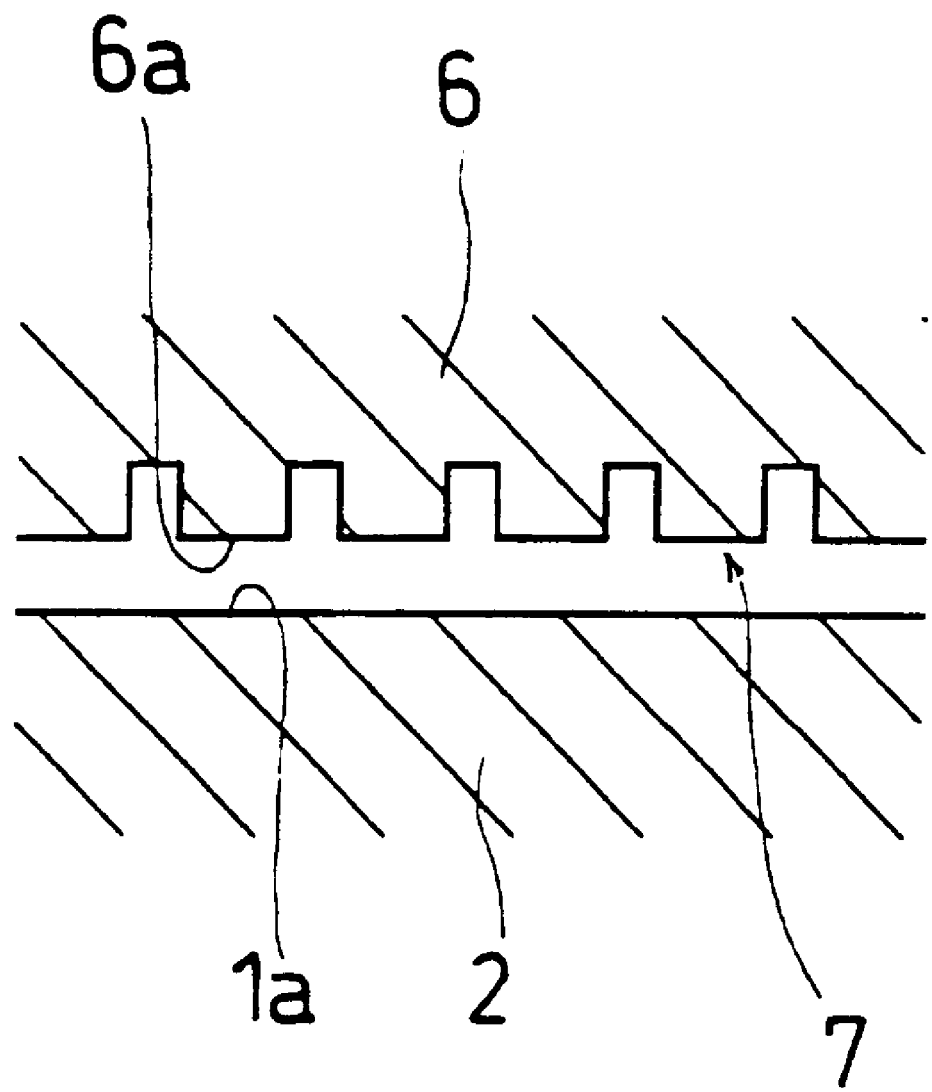
FIG. 7 is an enlarged fragmentary cross-sectional view of the proximity of a gap between the core mold making model and the component of FIG. 6.
Figure 8:
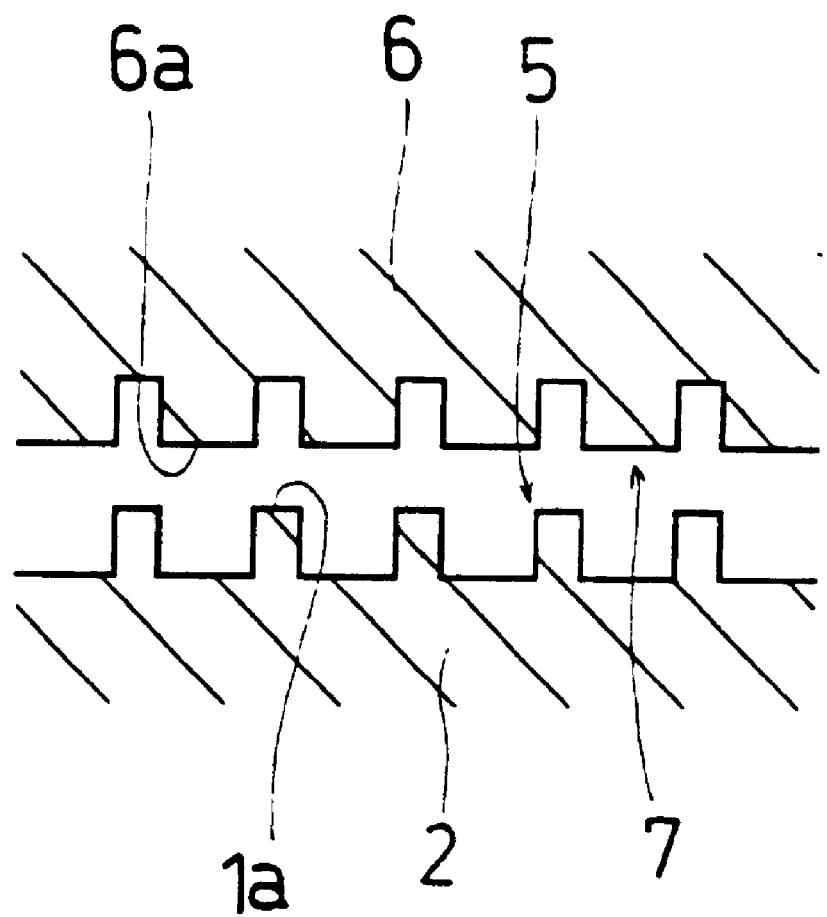
FIG. 8 is an enlarged fragmentary cross-sectional view showing a state where the concavo-convex pattern has been formed on the mold surface of the component.

Now, the core mold making model 6 and the component 2 are placed in an oil bath 15 of an electric discharge machine (for example "E-202H" manufactured by Seibu Electric & Machinery Co., Ltd. or the like), in such a manner that the surface 6a and the mold surface 1a oppose each other with a predetermined clearance, as shown in FIG. 6 and FIG. 7. Electrodes 16 and 17 of the electric discharge machine are attached to the core mold making model 6. Upon performing electric discharge machining under such circumstances, the reverse concavo-convex pattern 7 on the core mold making model 6 is transferred and resultantly the concavo-convex pattern 5 is formed on the mold surface 1a of the component 2 as shown in FIG. 8. Types and sizes of the reverse concavo-convex pattern 7 or concavo-convex pattern 5 are not specifically limited but can be grids, meshes, stripes, columnar shapes (projections) or patterns made of curves, etc. The normal size of grooves that form the reverse concavo-convex pattern 7 are approx. 0.5 to 1 mm in width, approx. 0.5 to 1 mm in depth and approx. 1 to 2 mm in pitch, while it is also possible to make the pattern coarser or finer, including a fine pattern that will create a mat appearance.

Because of employing the electric discharge machining to form the concavo-convex pattern 5 on the mold surface 1a of the component 2, the concavo-convex pattern 5 transferred from the reverse concavo-convex pattern 7 can be clearly formed, consequently resulting in an advantage that the design pattern 4 will also be vividly formed on the foam-molded article 3 produced with the core mold for foam-molding 1. Also, since it is not necessary to build a conventional sand mold and the core mold making model 6 can be repeatedly used once it is made, manufacturing costs can be lowered.

In addition, in a case where the core mold making model 6 is made of graphite (for example "FG-52" manufactured by Nippon Carbon Co., Ltd.) that is inexpensive, manufacturing costs can be further lowered, and further since graphite is a comparatively soft material it is easier to form the reverse concavo-convex pattern 7.

Further, executing a plurality of times the transference by electric discharge machining, changing each time the relative positions of the core mold making model 6 against the mold surface 1a will provide another advantage in that a more complicated concavo-convex pattern 5 can be formed, and that a small-sized core mold making model 6 can be employed for a large-sized core mold for foam-molding 1. For changing the relative position of the core mold making model 6 against the mold surface 1a, it is preferable to rotate or move at least either of the core mold making model 6 or core mold for foam-molding 1 in a prescribed direction.

Figure 9:
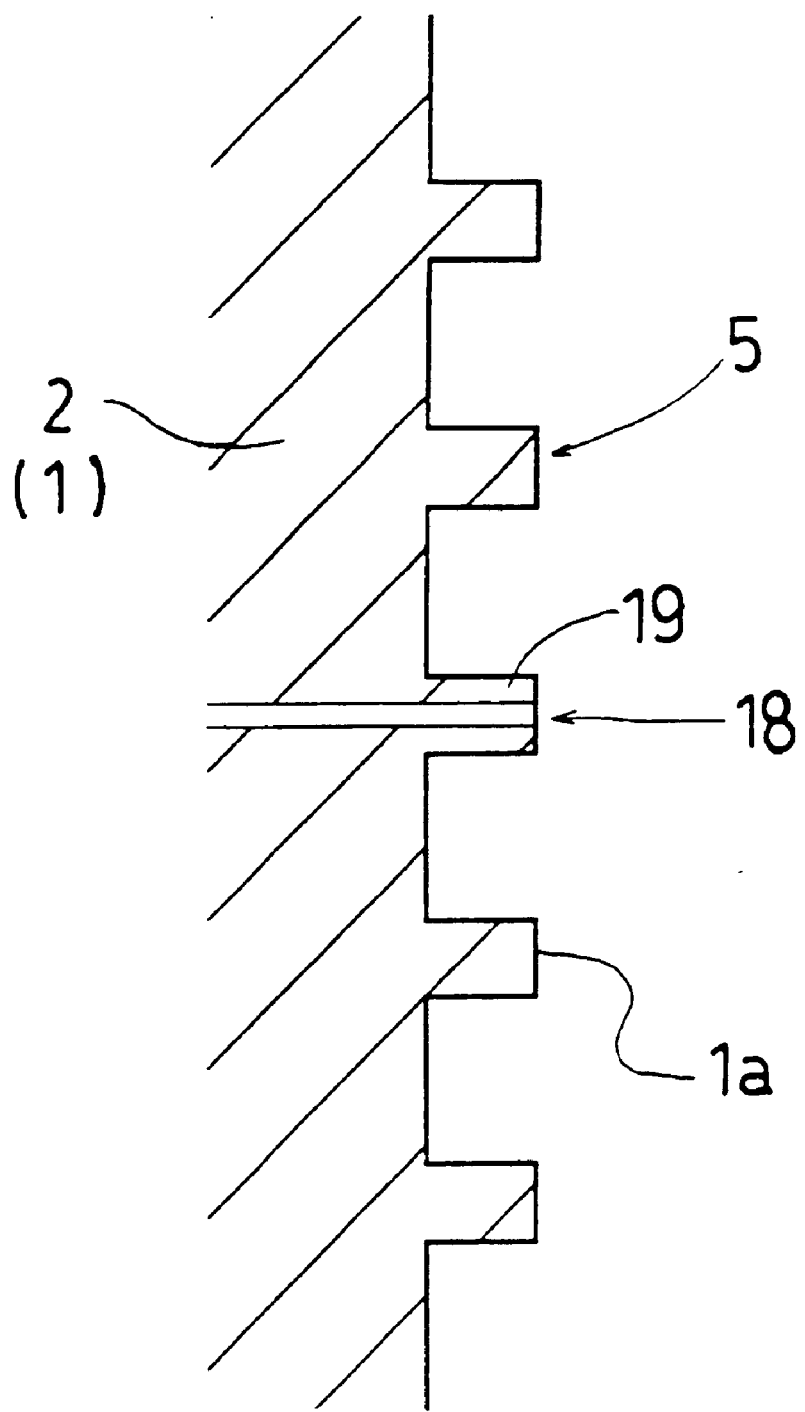
FIG. 9 is an enlarged fragmentary cross-sectional view showing an example of a steam path disposed through a convex portion of the concavo-convex pattern on the mold surface of the core mold for foam-molding.
Figure 10:
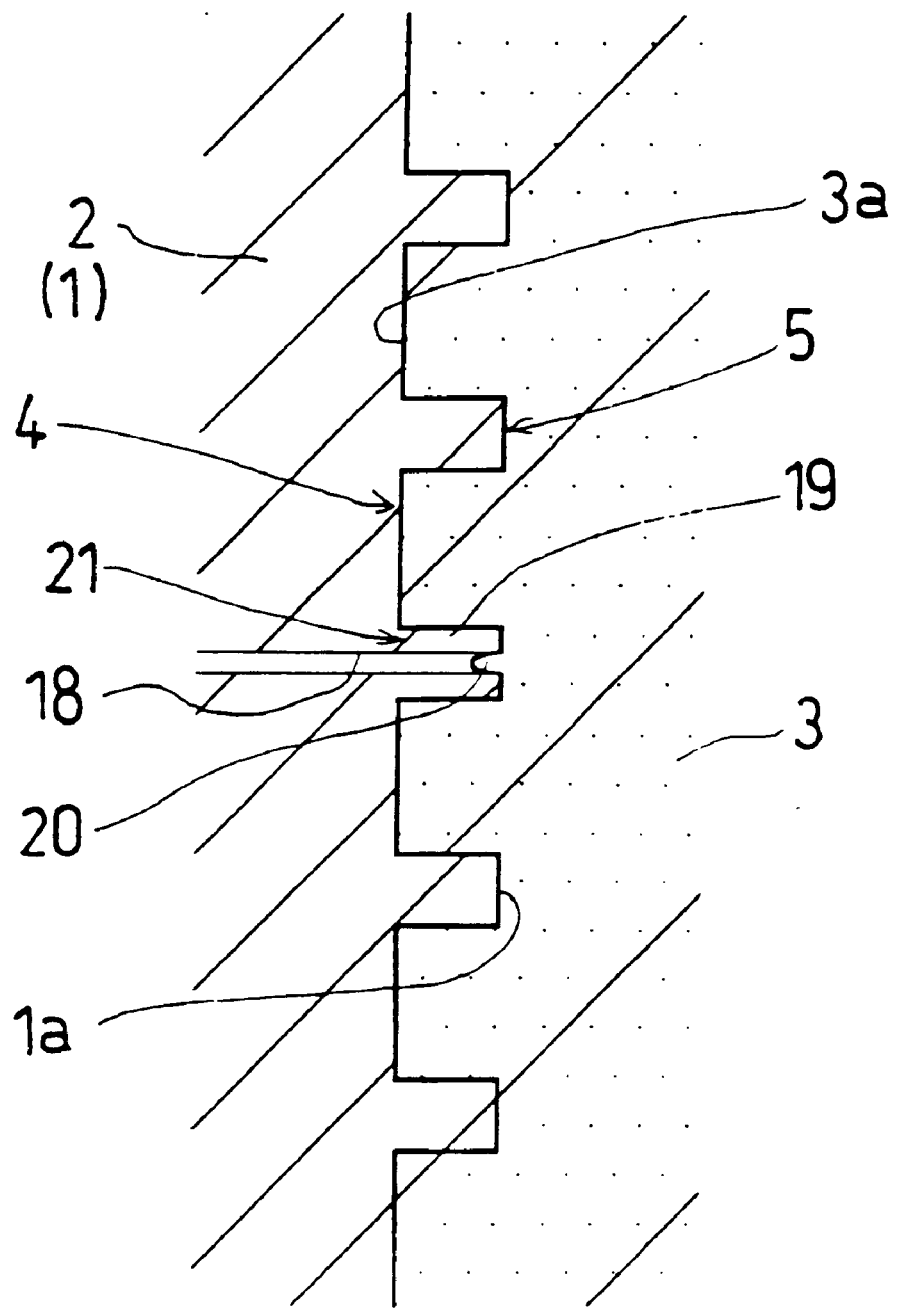
FIG. 10 is an enlarged fragmentary cross-sectional view showing a state where foaming is in process.
Figure 11:
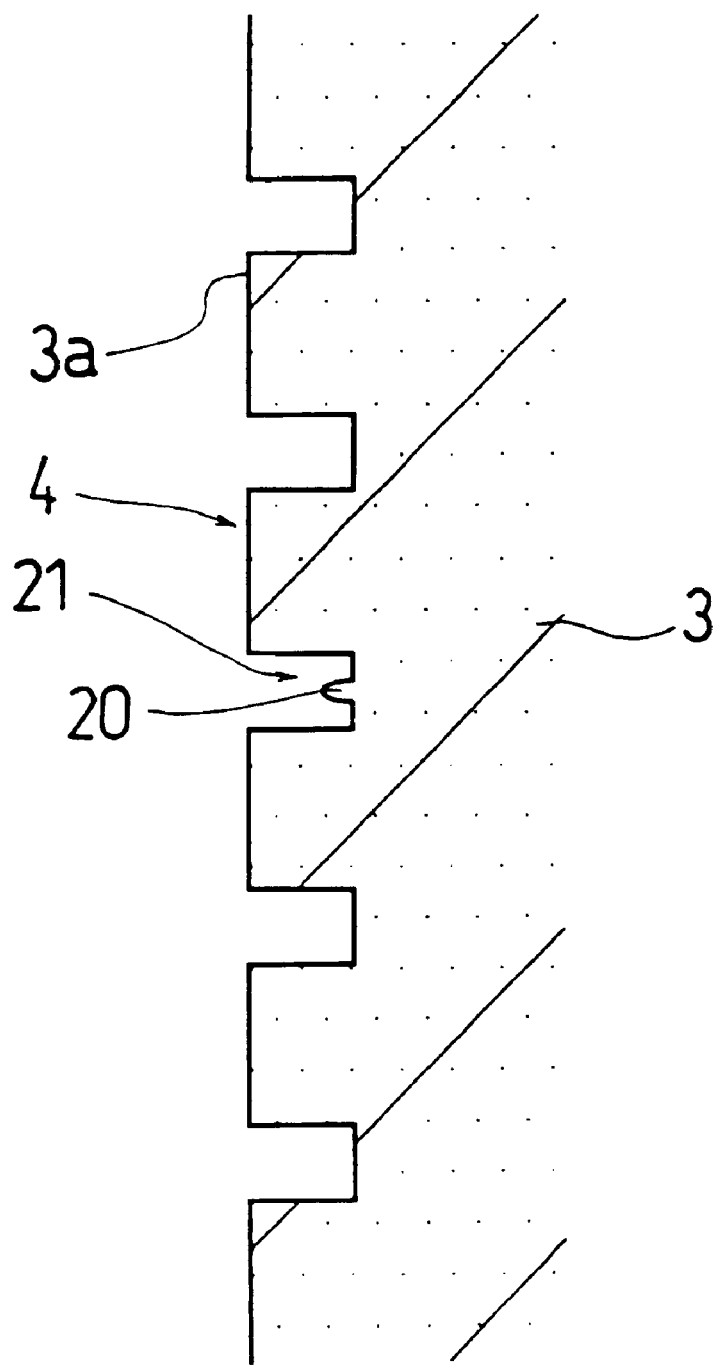
FIG. 11 is an enlarged fragmentary cross-sectional view showing a state where a steam path mark has been formed at a recess of the design pattern on the surface of the foam-molded article.

Referring to steam paths for supplying steam inside 8a of the mold unit, which can be made by machining etc., at predetermined positions on the component 2 or on the mold surface 1a of the assembled core mold for foam-molding 1, when a steam path 18 is disposed through a convex portion 19 of the concavo-convex pattern 5, a steam path mark 20 protruding into the steam path 18 due to expansion during the foaming process will be formed in a recessed portion 21 of the design pattern 4 on the foam-molded article 3 as shown in FIG. 9 through FIG. 11, therefore the steam path mark 20 will not be conspicuous.

Figure 12:
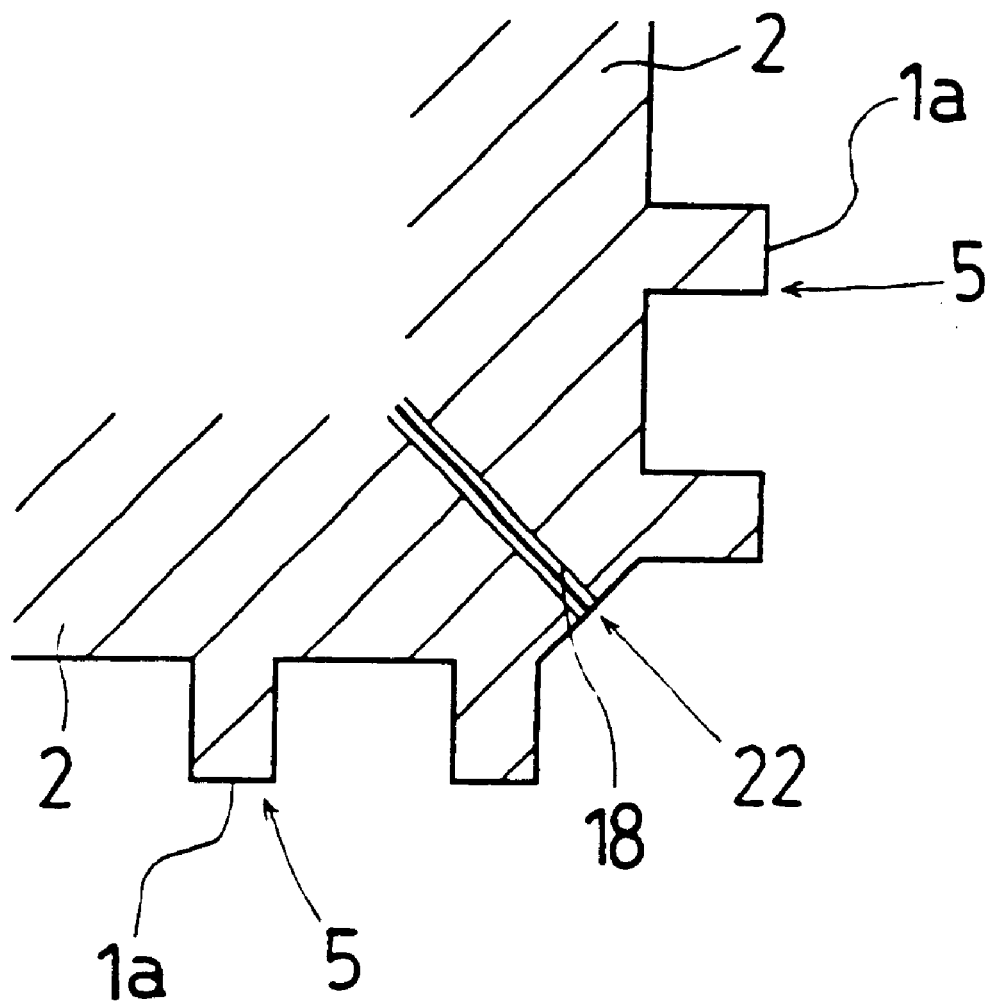
FIG. 12 is an enlarged fragmentary cross-sectional view showing an example of a steam path disposed at a joint of adjoining components.
Figure 13:
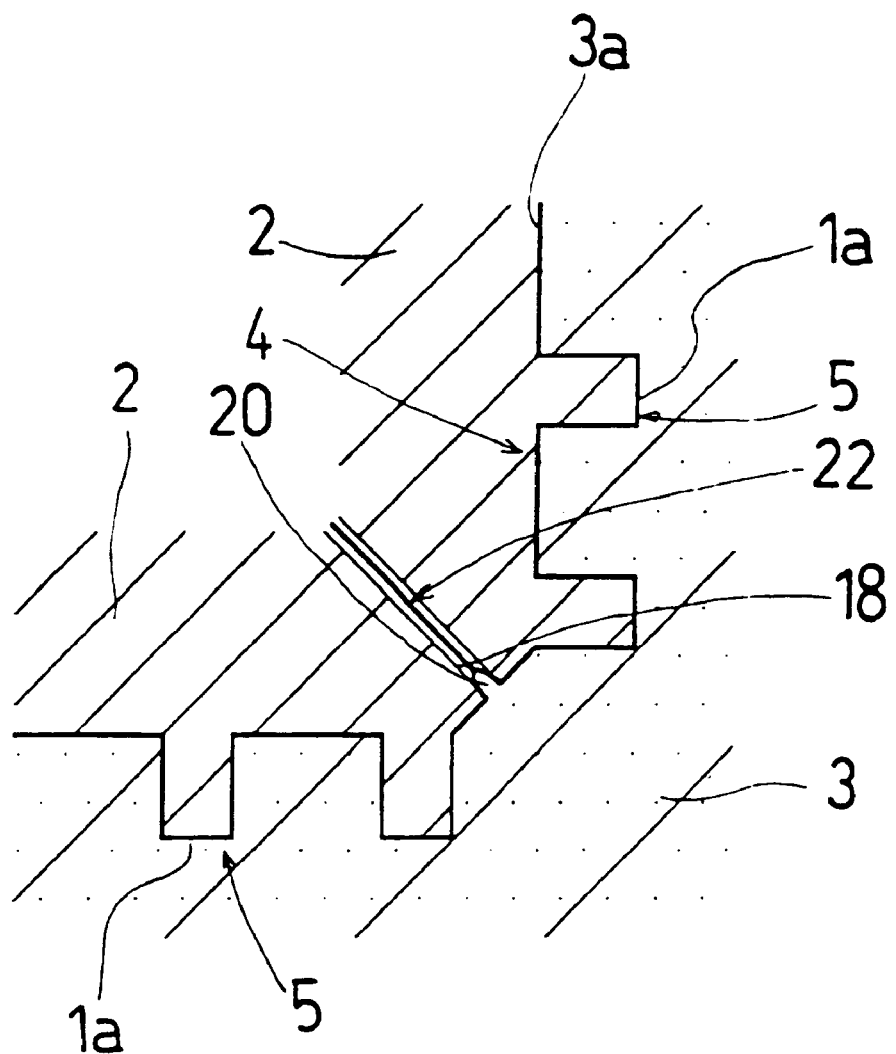
FIG. 13 is an enlarged fragmentary cross-sectional view showing a state where foaming is in process.
Figure 14:
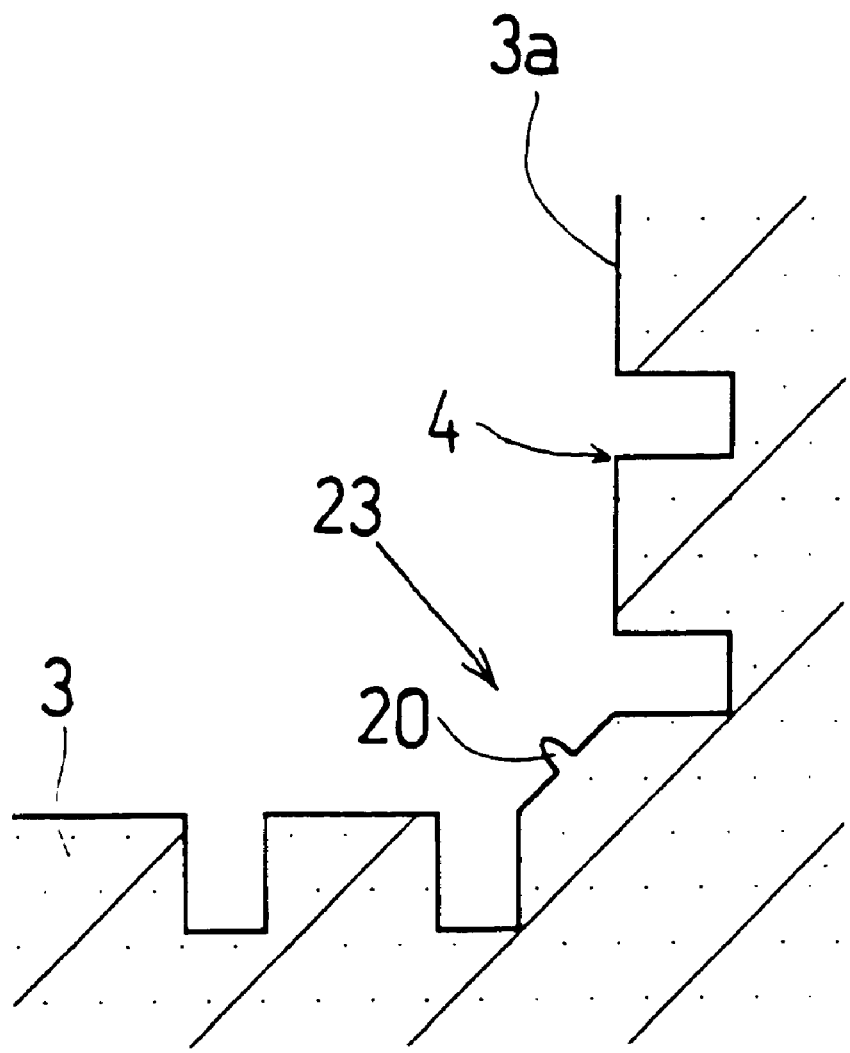
FIG. 14 is an enlarged fragmentary cross-sectional view showing a state where a steam path mark has been formed at a corner on the surface of the foam-molded article.

Also referring to FIG. 12 through FIG. 14, when a joint 22 of the components 2 is located at a corner of the core mold for foam-molding 1, a similar advantage in that the steam path mark 20 will not be conspicuous can be achieved by disposing the steam path 18 through the joint 22, since the steam path mark 20 will be formed at a corner 23 of the foam-molded article 3.

Further, when constructing the core mold for foam-molding 1 by adjoining a plurality of components 2 according to the first embodiment, the core mold for foam-molding 1 can be easily built since the components 2 of a simple shape, such as a plain board shape and the like, can be used for assembly. For this process, it is also preferable to first manufacture a large-sized component 2 and cut it into a plurality of pieces to assemble such pieces into the core mold for foam-molding 1.

Figure 15:
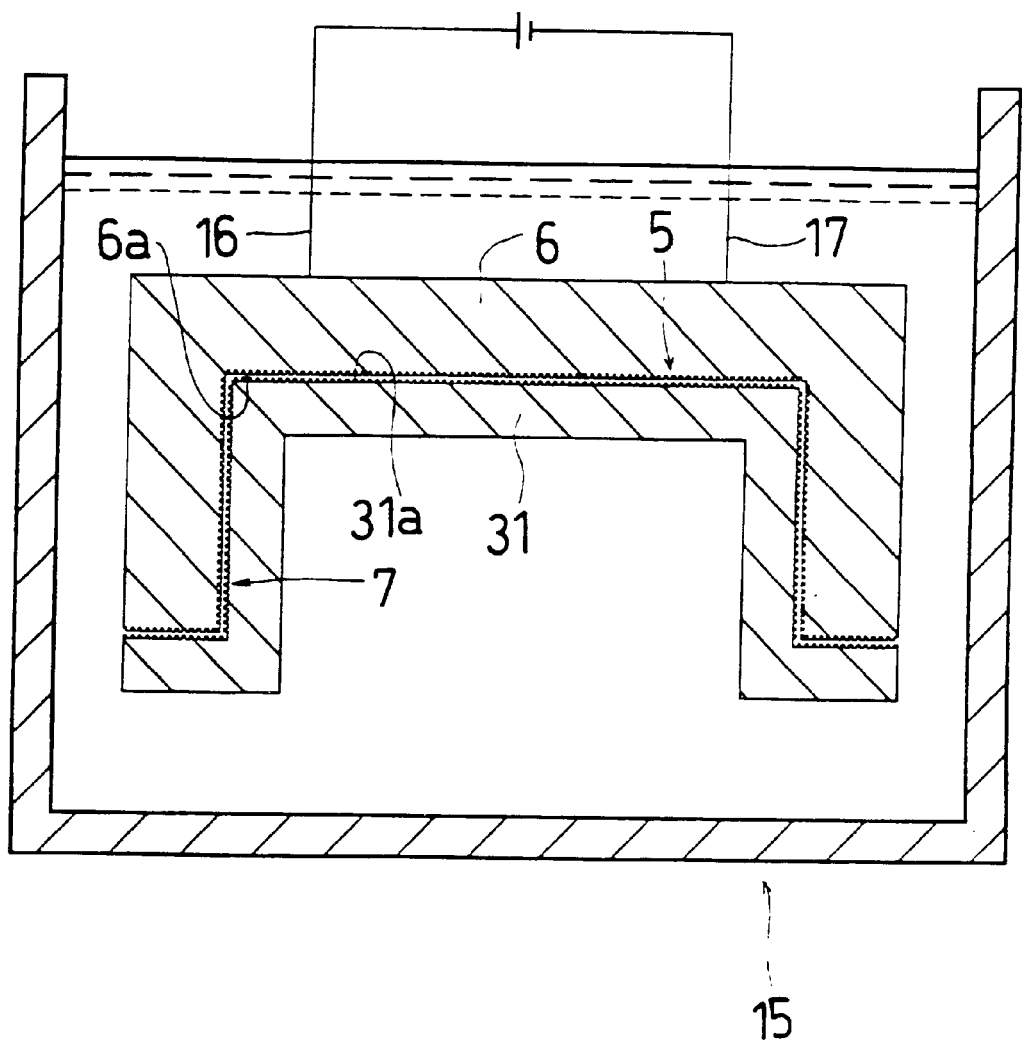
FIG. 15 is a schematic cross-sectional view showing a method for manufacturing a core mold for foam-molding according to the second embodiment.
Figure 16:
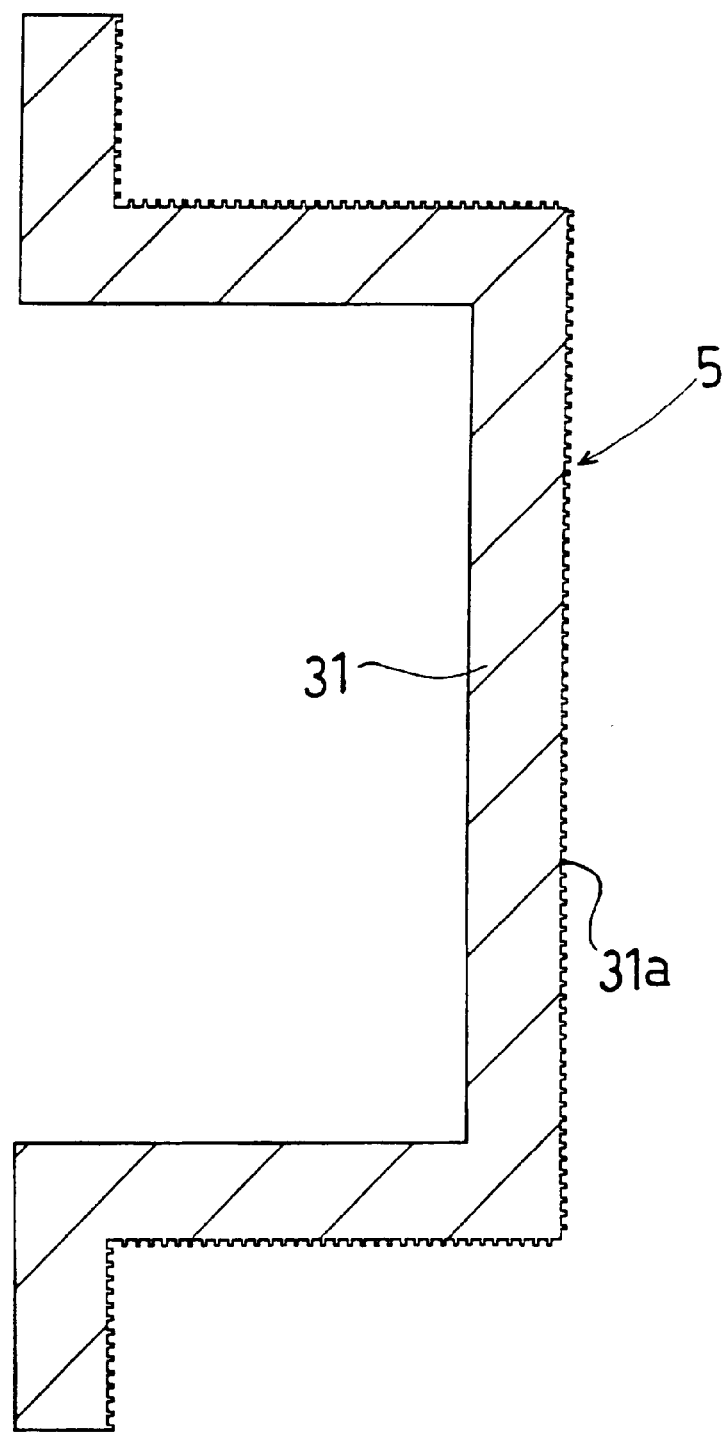
FIG. 16 is a cross-sectional view of the manufactured core mold for foam-molding.

As shown in FIG. 15 and FIG. 16, a method for manufacturing a core mold for foam-molding 31 according to the second embodiment is to form the core mold for foam-molding 31 in advance in a prescribed shape, instead of adjoining a plurality of components 2 as in the first embodiment.

In this case it is preferable to use a large-sized core mold making model 6 as this embodiment and match the shape of its surface 6a with that of the mold surface 31a of the core mold for foam-molding 31, however, without limitation to such a method it is also possible to use a small-sized core mold making model 6 and to execute a plurality of times the transference by electric discharge machining, changing each time the relative positions of the core mold making model 6 against the mold surface 31a, as already described. Other steps can be similarly performed as in the first embodiment.

According to the second embodiment, since the process of electric discharge machining for manufacturing the core mold for foam-molding 31 can be directly prepared without need to assemble the components 2, man-hours in manufacturing can be reduced.

As described above, according to the first method for manufacturing a core mold for foam-molding, since the concavo-convex pattern is formed by electric discharge machining to transfer the reverse concavo-convex pattern to the mold surface, the concavo-convex pattern transferred from the reverse concavo-convex pattern becomes vivid, and consequently the design pattern will also be vividly formed on the surface of a foam-molded article produced with the core mold for foam-molding. Also, since it is not necessary to build a sand mold and a core mold making model can be repeatedly used once it is made, manufacturing costs can be lowered. Further, in a case where the process of electric discharge machining can be directly prepared for manufacturing the core mold for foam-molding, man-hours in manufacturing can be reduced since it is not necessary to assemble the components.

According to the second manufacturing method, since the transference by electric discharge machining is executed a plurality of times changing each time the relative positions of the core mold making model against the mold surface, a concavo-convex pattern of a more complicated shape can be formed, and a small-sized core mold making model can be used for a large-sized core mold for foam-molding.

According to the third manufacturing method, the core mold making model is made of graphite that is inexpensive, therefore manufacturing costs can be further lowered, and since graphite is comparatively soft it is easier to form the reverse concavo-convex pattern.

Further, according to the first core mold for foam-molding, since a steam path is disposed through a convex portion of the concavo-convex pattern, a steam path mark protruding into the steam path due to expansion during the foaming process will be formed in a concave portion of the design pattern on the foam-molded article, and as a result the steam path mark will not be conspicuous.

According to the second core mold for foam-molding, since the core mold for foam-molding comprises a plurality of adjoining components that are the core molds for foam-molding, components of a simple shape such as a plain board shape and the like can be employed, and as a result the core mold for foam-molding can be easily assembled.

According to the third core mold for foam-molding, the steam path is disposed at a joint of the components, therefore when the joint of the components is located at a corner of the core mold for foam-molding the steam path mark will not be conspicuous, since the steam path mark will be formed at a corner of the foam-molded article.

WORKING EXAMPLE

Now a working example according to the invention shall be described hereunder.

A plain board made of graphite was used as a core mold making model. A reverse concavo-convex pattern was formed on the surface of the core mold making model by providing a vertical and horizontal (grid pattern) grooves (width 0.5 mm, depth 0.5 mm, pitch 1 mm in vertical and horizontal directions) using an NC machine (Machining Center PC55V manufactured by Shin Nippon Koki Co., Ltd.). A plain board made of aluminum (945 mm×280 mm×5 mm) was used as a component of the core mold for foam-molding.

A concavo-convex pattern was formed on the mold surface of the component by the mentioned electric discharge machining, to transfer the reverse concavo-convex pattern of the core mold making model. The rear face of such a component was adhered to the mold surface of a commercially available core mold for foam-molding mounted on a foam-molding machine (P300 manufactured by Toyo Machinery & Metal Co., Ltd.), and a foam-molded article (foamed polypropylene, expansion rate 30 times) was produced.

Figure 17:
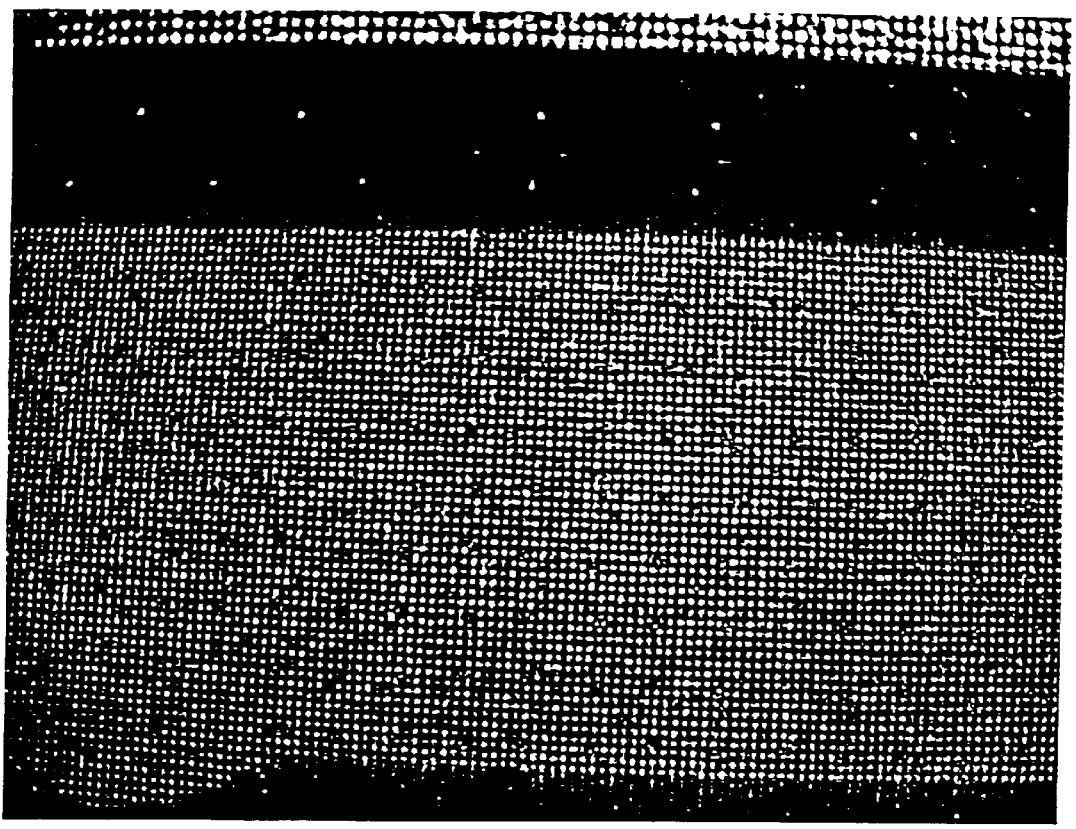
FIG. 17 is a photograph of the surface of a foam-molded article produced according to the working example.

On the surface of the obtained foam-molded article, a design pattern has been formed that is comprised of a multitude of protrusions disposed in a constant pitch in vertical and horizontal directions and of grid-patterned grooves among the protrusions (refer to FIG. 17). The surface quality of the design pattern was evaluated through observation of the design pattern by counting the number of dimpled portions where the protrusion is not visually recognized to have been formed (counting area per section: 50 mm×50 mm, average value was worked out from counts of five arbitrarily selected sections) Results are as shown in Table 1.

TABLE 1

Surface quality of the design pattern

| | Number of dimpled portions (pieces) |
|---|---|
| Working example | 0 |
| Comparative example | 7.8 |

As evidently proven by FIG. 17 and Table 1, no dimpled portion was visually recognized in the design pattern formed on the foam-molded article of the working example. This can be understood as a result of the fact that the design pattern has been transferred so clearly that a form of the pre-expanded beads constituting the foam-molded article does not remain after the foam-molding process.

COMPARATIVE EXAMPLE

A foam-molded article was produced in a similar manner to the working example except that a component of the plain board shape (930 mm×260 mm×5 mm, made of aluminum) manufactured according to the method disclosed in the JP-A-H12-108134 was used, and the surface quality of the design pattern (refer to FIG. 18) was evaluated in the same way as the working example. Results are as shown in Table 1. Also, according to this prior art, a model was constructed by adhering to a wood mold a sheet material having a concavo-convex pattern that is the same as the reverse concavo-convex pattern of the working example, then a sand mold was made for which the concavo-convex pattern was transferred from the model, after which the component having a mold surface for which the concavo-convex pattern was again transferred from the sand mold was made by casting.

Figure 18:
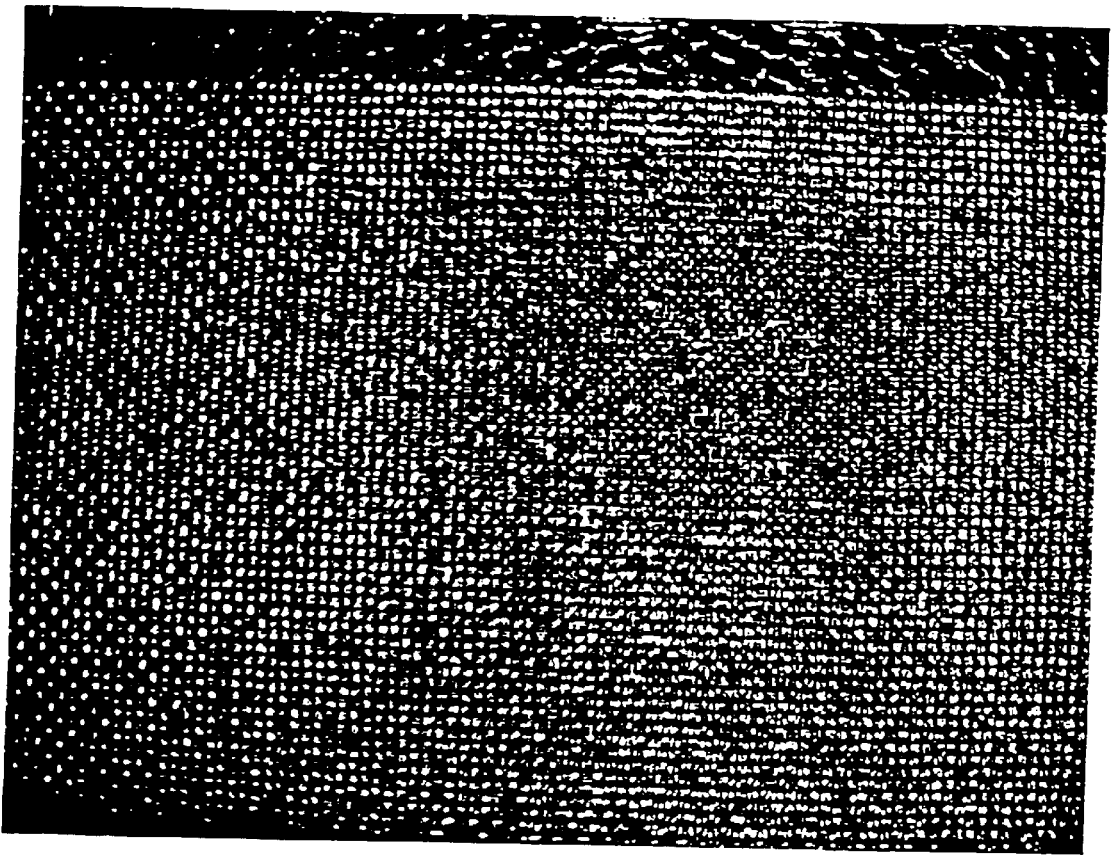
FIG. 18 is a photograph of the surface of a foam-molded article produced according to the comparative example.

As evidently proven by FIG. 18 and Table 1, a relatively large number of dimpled portions was visually recognized in the design pattern formed on the foam-molded article of the comparative example. This can be understood as a result of the fact that since the design pattern has not been clearly transferred, the form of pre-expanded beads has partly remained even after the foam-molding process.

What is claimed is:

1. A method for manufacturing a core mold for foam-molding provided with a concavo-convex pattern on its mold surface for forming a design pattern on the surface of a foam-molded article, comprising the steps of:

forming a reverse concavo-convex pattern that is reverse of said concavo-convex pattern, on the surface of a core mold making model made of a conductive material having the same shape as said mold surface; and transferring said reverse concavo-convex pattern by electric discharge machining to said mold surface, so as to form said concavo-convex pattern.

2. A method for manufacturing a core mold for foam-molding as set forth in claim 1, further comprising the step of executing a plurality of times said transference by electric discharge machining, each time changing relative positions of said core mold making model against said mold surface.

3. A method for manufacturing a core mold for foam-molding as set forth in claim 1 or 2, wherein said core mold making model is made of graphite.

* * * * *